United States Patent [19]

Parrier et al.

[11] 4,206,490
[45] Jun. 3, 1980

[54] ELECTRICAL DETECTION, SAFETY AND SELECTION CIRCUITS

[76] Inventors: Henri Parrier; Andre Parrier; Jean Parrier, all of Rue de la Sabliere, Saint Genis les Ollieres (Rhone), France

[21] Appl. No.: 878,298

[22] Filed: Feb. 16, 1978

[51] Int. Cl.² .............................................. H02H 3/16
[52] U.S. Cl. ................................................... 361/42
[58] Field of Search ............................. 361/42, 47, 49

[56] References Cited
U.S. PATENT DOCUMENTS 4,099,215  7/1978  Parrier et al. .......................... 361/42

FOREIGN PATENT DOCUMENTS 420036  4/1972  U.S.S.R. ..................................... 361/42

Primary Examiner—Harry E. Moose, Jr.
Attorney, Agent, or Firm—Remy J. VanOphem

[57] ABSTRACT

The invention relates to a security apparatus for detecting a fault such as a short circuit or ground fault in an electrical apparatus. Two similar but oppositely poled detection-and-safety circuits are coupled in parallel such that when one of said detectors energizes, the other does not. The invention also includes safety circuits having back-to-back Zener diodes so that spurious signals below a pre-selected level do not disturb the normal operations of the electrical apparatus being protected.

10 Claims, 18 Drawing Figures

ELECTRICAL DETECTION, SAFETY AND SELECTION CIRCUITS

FIELD OF THE INVENTION

The present invention relates to improvements in electrical detection, safety and selection circuits. The purpose of such circuits is to ensure reliable operation even if a fault occurs in the circuit itself.

BACKGROUND OF THE INVENTION

French Pat. No. 2.299.750 in particular and its first Certificate of Addition No. 2.335.079 disclose a device in which a direct monitoring voltage is applied to the terminals of a switch or relay controlled by a transistorised detection circuit. A fault in the insulation or a short circuit creates a leakage current which passes through the transistors and may cut the power to a machine as soon as it reaches a value of the order of 2 mA. A device of this type may be adapted to various types of circuit for monitoring the supply of alternating or direct current, whatever the state of the earth. The detection threshold is adjustable, whereas the detector is connected to the machine circuit for example by means of a diode bridge.

The present invention intends to provide an improved detector, ensuring its own safety, preventing any parasite anomaly introduced by the earth wire and making it possible to connect the neutral directly to earth.

SUMMARY OF THE INVENTION

An electrical safety device according to the invention comprises a monitoring circuit supplied permanently with a direct voltage applied to the terminals of a detection apparatus connected, by a circuit diode bridges, to the circuit for supplying the machine to be checked and it is characterised in that it comprises a double power circuit, a double switching device and a double transistorised tripping circuit, these double systems being connected in order to form two safety devices connected in parallel, each of the latter actuating, in the opposite direction to the other, its own switching system, the two safety devices being connected to operate in opposition in order to monitor each other, whereas finally the double device is connected to the machine circuit, to the machine frame and to earth by a double bridge of diodes forming two circuits one independent of the other, on the one hand and, on the other hand by diodes of the Zener type connected in pairs on the machine frame wires, the supply wire and the earth wire.

According to another feature, the monitoring circuit comprises, downstream of the detection and safety devices, a double potentiometer and re-setting system comprising two knobs or one knob having two staggered contacts, these means being arranged such that the two basic devices are completely independent of each other.

According to another feature, each of the safety circuits comprises a tripping circuit having a transistorised amplifying connection, whereas a single transistor is inserted between the monitoring circuit and the detection circuit, which transistor is arranged in the following manner:

its base receives the leakage current through at least one or other of the diode bridges;

its collector is connected firstly to the base of the first amplifier transistor provided on the first tripping circuit and secondly to the collector of the second transistor of the second detection circuit;

its emitter is connected firstly to the emitter of the second transistor connected in the first detection circuit, secondly to the emitter, but also to the base of the amplifier of the first detection circuit.

Thus, this connection and circuit of the switching devices make it possible to obtain the reverse operation of the means (for example of the relays, indicators ...) for detecting an anomaly. For example, the detection of a fault opens a relay and the power circuit (first detection circuit), whereas this same fault closes the second detection circuit. It one of the tripping circuits is inoperative, the other comes into operation.

According to another feature, the frame of the machine is connected to the circuit systems by a cable comprising two Zener diodes, connected in opposition and regulated to a tripping threshold of approximately 7 Volts for the purpose of filtering parasite imbalances. Similarly, two Zener diodes whose tripping threshold (for filtering) is approximately 13 Volts are connected on the connection wire to the neutral point of the supply circuit.

According to another feature, the frame of the machine and the earth are connected by a wire containing two Zener diodes, connected in opposition and having an opening threshold of 22 Volts for a fault on the main earth wire. An individual selection is made on each machine, the fault on the earth line being injected upstream of these diodes on the one hand and at the diode bridges of the safety device on the other hand. Similarly, a fault on the machine frame is blocked, up to 22 Volts, by the Zener diodes: it is not sent to the earth, but to the detection circuit. Above this voltage the Zener diodes open.

A fault on the earth line common to serveral machines is sent to the safety circuit, whereas the Zener diodes prevent its passage to the machine frame.

The individual selection of each machine is made by a circuit comprising a blocking system when a fault arrives from the earth, the detection of the anomaly taking place for example, by blocking one of the bridges by a capacitor, or, as a variation, by controlling the trigger of a triac.

According to another feature, the fault and short circuit detector comprises a neutral point of the supply circuit connected directly to earth by a cable whereof one portion is wound about a soft iron core to form a winding comprising few turns, whereas the bridge of the detector device is connected to the terminals of a fine wire winding, comprising many turns (for example 500 times more than the large winding) wound around the same soft iron core to form a transformer.

The fine winding is supplied with permanent direct voltage which is applied to two opposed terminals of the bridge whose two other terminals are connected to the tripping device and to the cut-off circuit through an amplifier.

When a fault signal circulates in the wire connecting the neutral to earth, the permanent voltage applied by the "transformer", to the terminals of the bridge is subject to a variation able to cause imbalance of the bridge. This voltage of the fault is detected as soon as the intensity of the leakage current in the neutral-earth wire reaches 2 mA.

According to another feature, when the machine is actuated by an electric motor which operates at its nominal torque, the earthing of one phase or a leakage current on one phase causes an excess voltage on the other phase of the motor circuit, which may be damaged. In order to prevent this drawback, a tripping and detection device is placed on the three phases of the circuit using the motor, which device constitutes a static switch comprising, for each phase, a bridge whereof one terminal is connected to a terminal of the secondary winding of a transformer. The primary winding is connected in the phase wire. An excess voltage in the phase is detected at the corresponding bridge, whereas a triac constitutes a blocking safety device.

The accompanying drawings, given as a non-limiting example, will make it easier to understand the features of the invention.

BRIEF DESCRIPTION OF THE DRAWINGS

Figure 1:
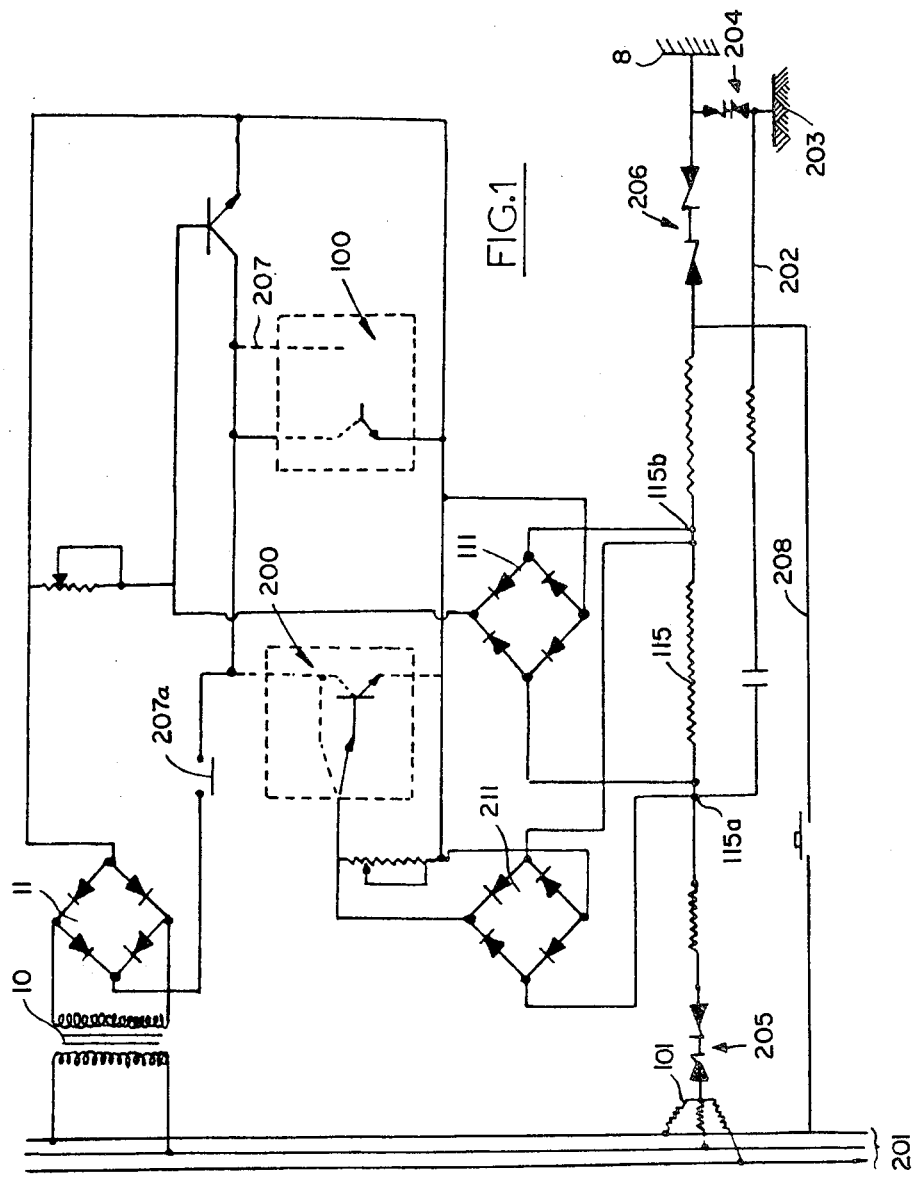
FIG. 1 is the electrical circuit diagram of a device according to the invention.

The basic device of FIG. 1 is a double safety device, for detecting both positive (insulation fault) and negative (error signal coming from the earth) faults. It comprises:

a monitoring circuit applying, by way of the transformer 10 and bridge 11, a D.C. voltage to the terminals of a double safety device including circuits 100 and 200;

safety circuits comprising detection circuits 100 and 200 which are independent of each other, are connected in parallel and operate one in the opposite sense to the other;

a supply, for example a three phase alternating current supply, shown diagrammatically at 201;

bridges interposed between the supply circuit and each of the two detection circuits. These bridges comprise diode bridges 111 and 211 connected in an indentical manner to the terminals of a resistance 115 in a wire connected to the machine frame 8;

a safety circuit 202 for blocking a possible fault coming from an earth line 203;

Zener diodes connected in pairs in the following circuits:

a circuit connecting the machine frame to the earth line; Zener diodes 204 have a breakdown voltage threshold close to the maximum fault voltage of the machine (for example 22 Volts);

a circuit connecting the neutral of the supply to the machine frame; a first pair of Zener diodes 205 is connected between the neutral and the upstream circuit 115a of the diode bridges; a second pair of Zener diodes 206 is connected between the downstream circuit 115b of the bridges and the connection between the machine frame wire and the earth wire;

a re-setting device 207, 207a comprising a switch having two staggered contacts arranged to re-start, the power circuits of the detection circuits 100 and 200 in a predetermined sequence;

a test circuit 208 for checking the correct operation of the detection circuits 100 and 200 by means of indicators of the type described in French Pat. No. 2.299.750.

Figure 6:
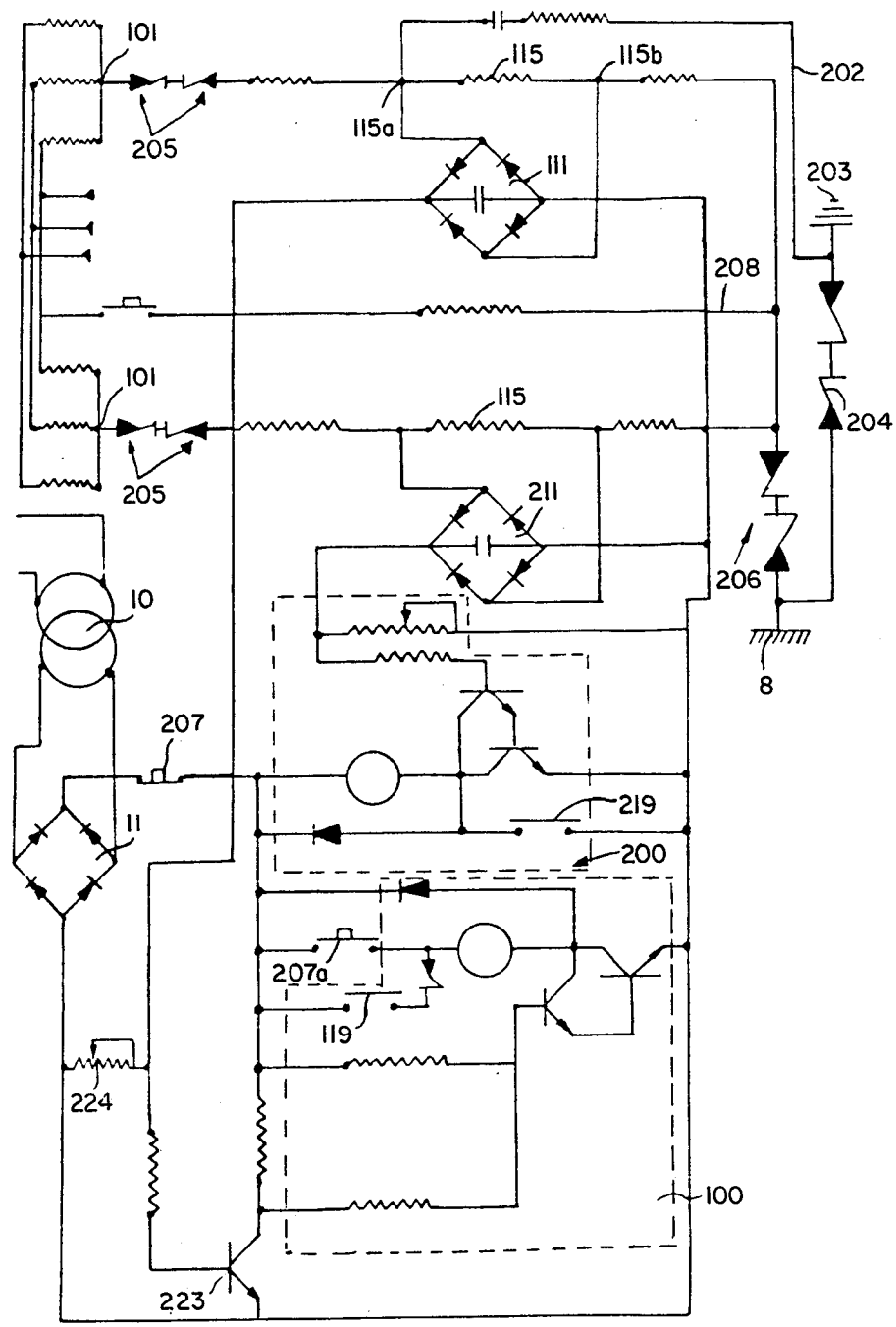
FIG. 6 is a detailed view of the devices ensuring positive safety and negative safety.

As will be seen hereafter, the entire circuit is shown in detail in FIG. 6, which shows in particular the operation of the detection circuits 100 and 200 and their action on relays or switching devices of the power circuits.

Figure 2:
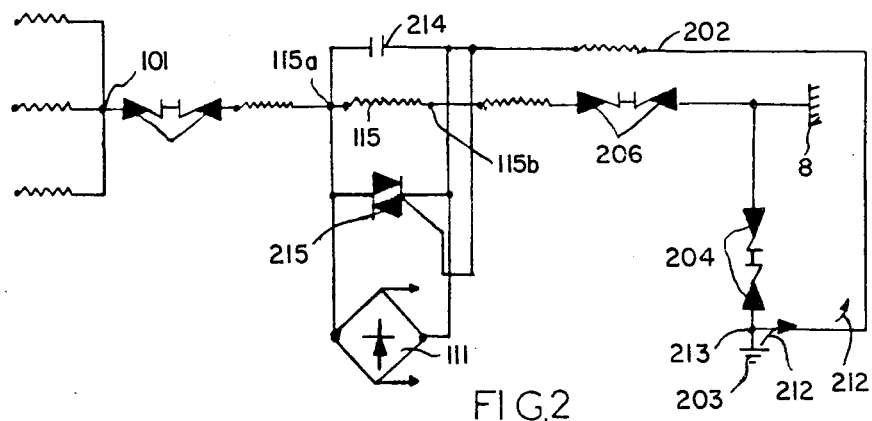
FIG. 2 shows one construction of the selecting safety system.

FIG. 2 illustrates the circuitry which protects each machine against an earth fault, which circuitry includes in particular the arrangement of the Zener diodes 204 and 206.

A fault signal 212 appearing on the earth wire is blocked at point 213 by the diodes 204 (threshold equals 22 Volts). The fault signal is sent through the circuit 202 to a capacitor 214 and a triac 215 connected in parallel with the capacitor. This blocks either of the bridges by creating an imbalance at the terminal 115a.

In the same way, a fault on the frame 8 is detected by the diode bridge, but no fault signal appears on the earth wire until the threshold voltage of the Zener diodes 204 is exceeded.

Consequently, an electrical anomaly creating a leakage current of the order of 2 mA cuts-off the machine in question but does not disturb the earth wire. This avoids the turning off of other machines provided with the same safety circuitry.

Figure 3:
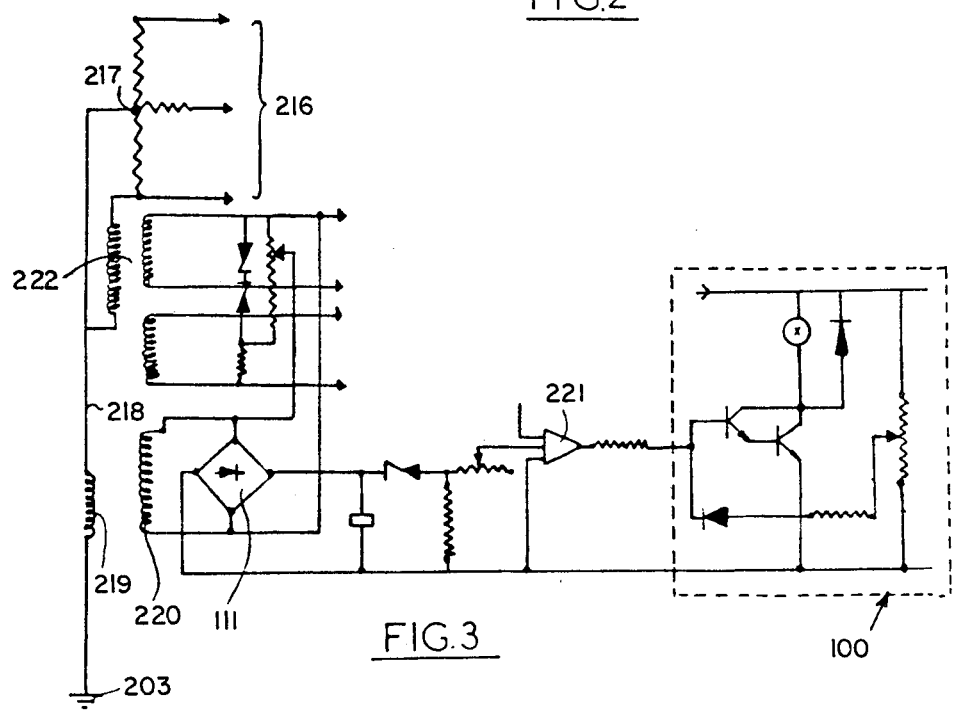
FIG. 3 shows an apparatus with the neutral connected directly to earth.

In the embodiment of FIG. 3, a circuit is provided for detecting a fault on an installation 216 whose neutral 217 is connected directly to the earth wire 203, i.e. no substantial electrical component is connected between the neutral 217 and the earth 203.

In order to detect a fault or short circuit on the wire 218, a voltage transformer is provided at the terminals of which the bridges 111 and 211 are connected. The primary winding of this transformer is formed by a winding 219 comprising a small number of turns of a wire of large section. The secondary winding is constituted by a fine winding 220 comprising for example 500 times more turns than the winding 219. The windings 219 and 220 are wound around the same soft iron core. The fine winding 220 is continuously supplied with a voltage of 12 Volts which is also applied to two opposite terminals of a bridge 111. In the example of FIG. 3, the direct voltage is obtained from a first transformer and a Zener diode circuit.

A fault current of 2 mA (in the fine winding of in the large winding) creates a variation of voltage at the terminals of the bridge 111, which is thus thrown out of balance. The outputs of this bridge are connected one to one input of an amplifier 221, the other directly to the input of the detector 100. The amplifier 221 is supplied by the secondary winding of the first transformer 222. The voltage of 12 Volts plus the fault voltage produced by a current of the order of 2 mA is thus amplified, which makes it possible to trip a cut-off relay of the detector whose structure is known.

Figure 5:
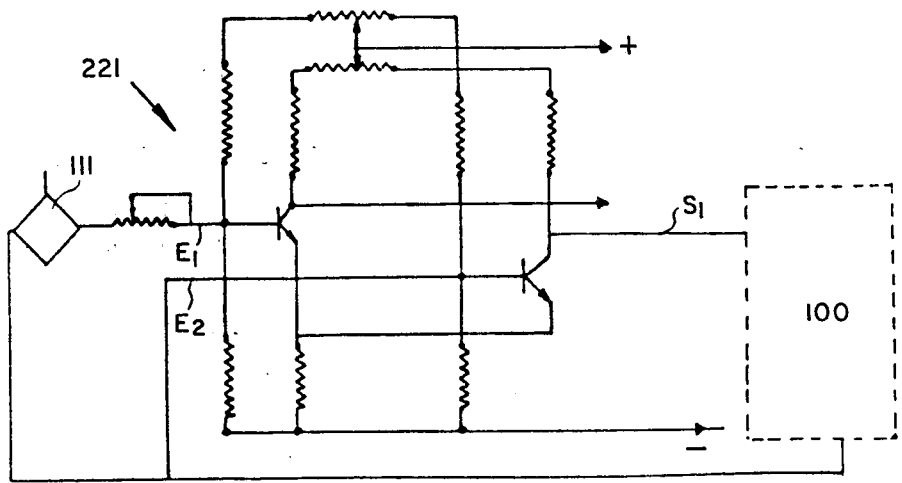
FIG. 5 is a diagram of the connection of the amplifier of FIG. 3.

The detailed electrical circuit diagram of the intermediate amplifier 221 is illustrated in FIG. 5. The fault signal coming from the bridge 111 is injected at $E_1$ to the base of a transistor. A supply voltage is applied to the amplifier which also receives an input from the emitter circuit of the system for tripping the relay in the detector. The output $S_1$ of the amplifier is fed back by the circuit 100 to the input $E_2$.

Figure 4:
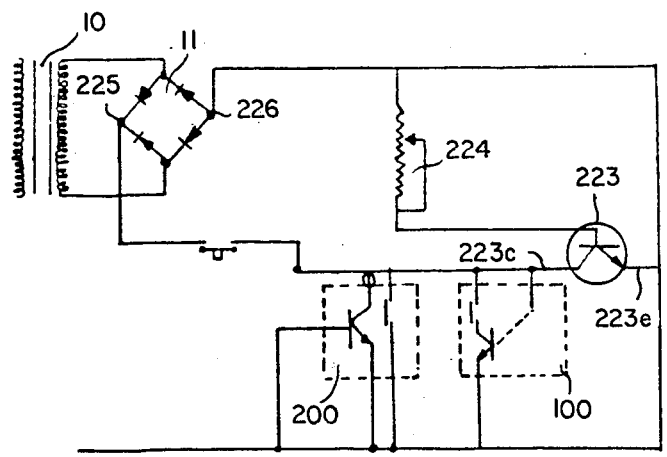
FIG. 4 is a detail of the monitoring circuit.

The monitoring circuit continuously applies a direct voltage to each of the two detection circuits 100 and 200. As shown in FIG. 4, the wiring of the two detection circuits is slightly different. The circuitry is supplied through the transformer 10 and bridge 11. The monitoring voltage is applied to the base and collector circuits of a transistor 223. The emitter circuit of this transistor is connected to the base through a potentiometer 224 of high ohmic value.

The first detection circuit 100 is connected such that its transistorised tripping circuit (c.f. FIG. 6) is supplied by the collector current of the transistor 223, whereas this collector 223c is connected to the output of the tripping circuit of the second detection circuit 200.

Conversly, the emitter 223e receives the emitter signals from the two detectors in order to apply them to the base of the second detector.

Thus, the direct voltage applied to the terminals of the relays of the two circuits is of opposed direction. A fault signal passing through one and/or the other of the tripping circuits causes the opening of a circuit for example (de-excited relay) and the closure of the other (excited ralay).

In fact, it is possible to consider that the detection circuits 100 and 200 are connected in parallel between the two junctions 226 and 225 of the monitoring bridge 11 when the cut-off relays for the power circuits are reversed. The wiring is shown in detail in FIG. 6, which shows a complete safety device for the individual control of a machine. If the apparatus 100 does not operate, the apparatus 200 operates and vice versa. When they both operate, each fault signal (insulation, short circuit . . . ) causes a change of state of the two relays by the movement of the moving contacts 119 and 219. Furthermore, possible parasite signals are blocked by the Zener diodes 206 which have a tripping threshold of approximately 7 Volts.

It will be noted that FIG. 6 shows two circuits for supplying the machine. The purpose of this is solely to clarify the drawing. In fact, it is the same circuit shown twice.

Figure 7:
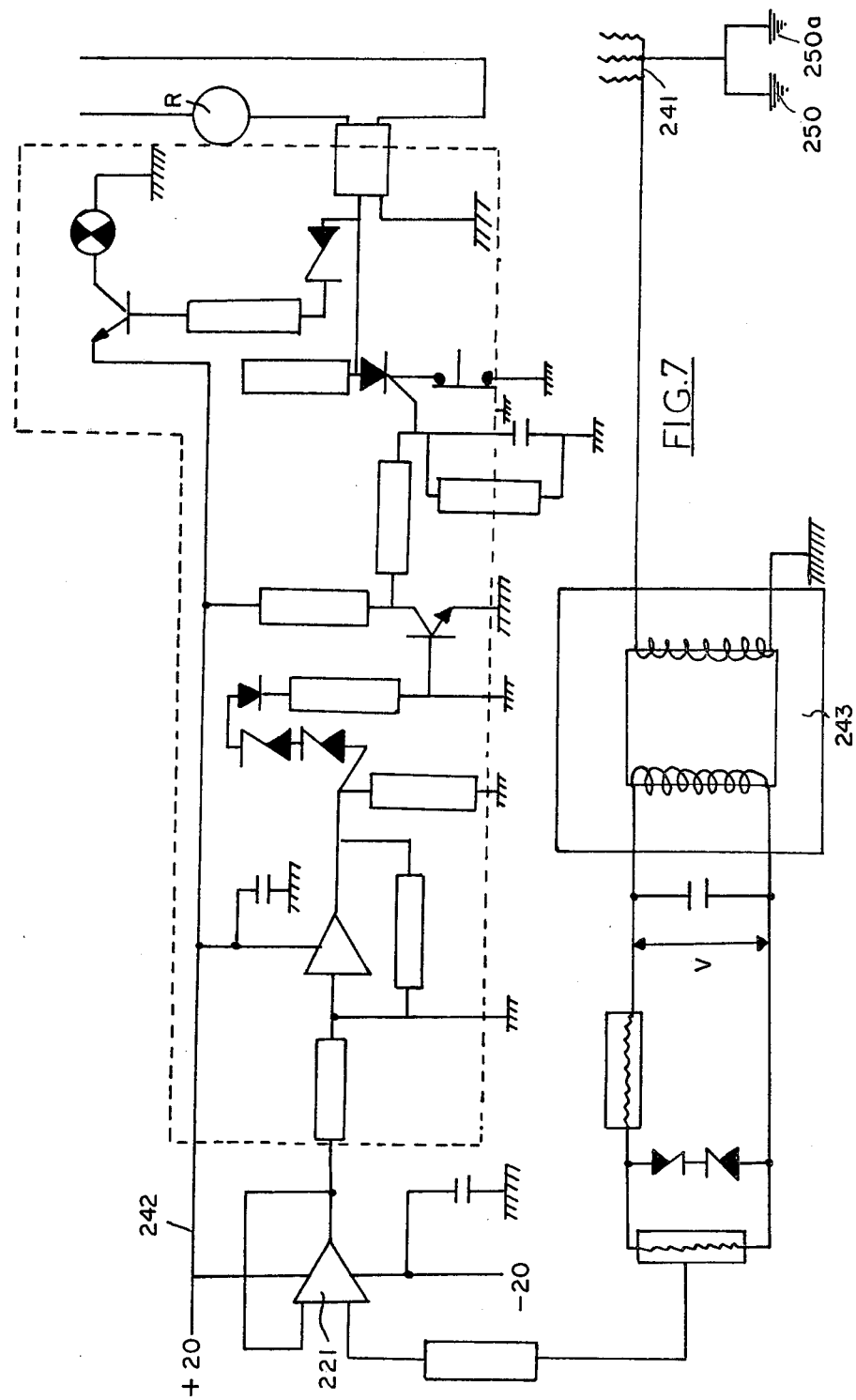
FIG. 7 is a variation of the connection with the neutral connected to the earth on the transformer and interconnected to earth on the utilization circuit.
Figure 8:
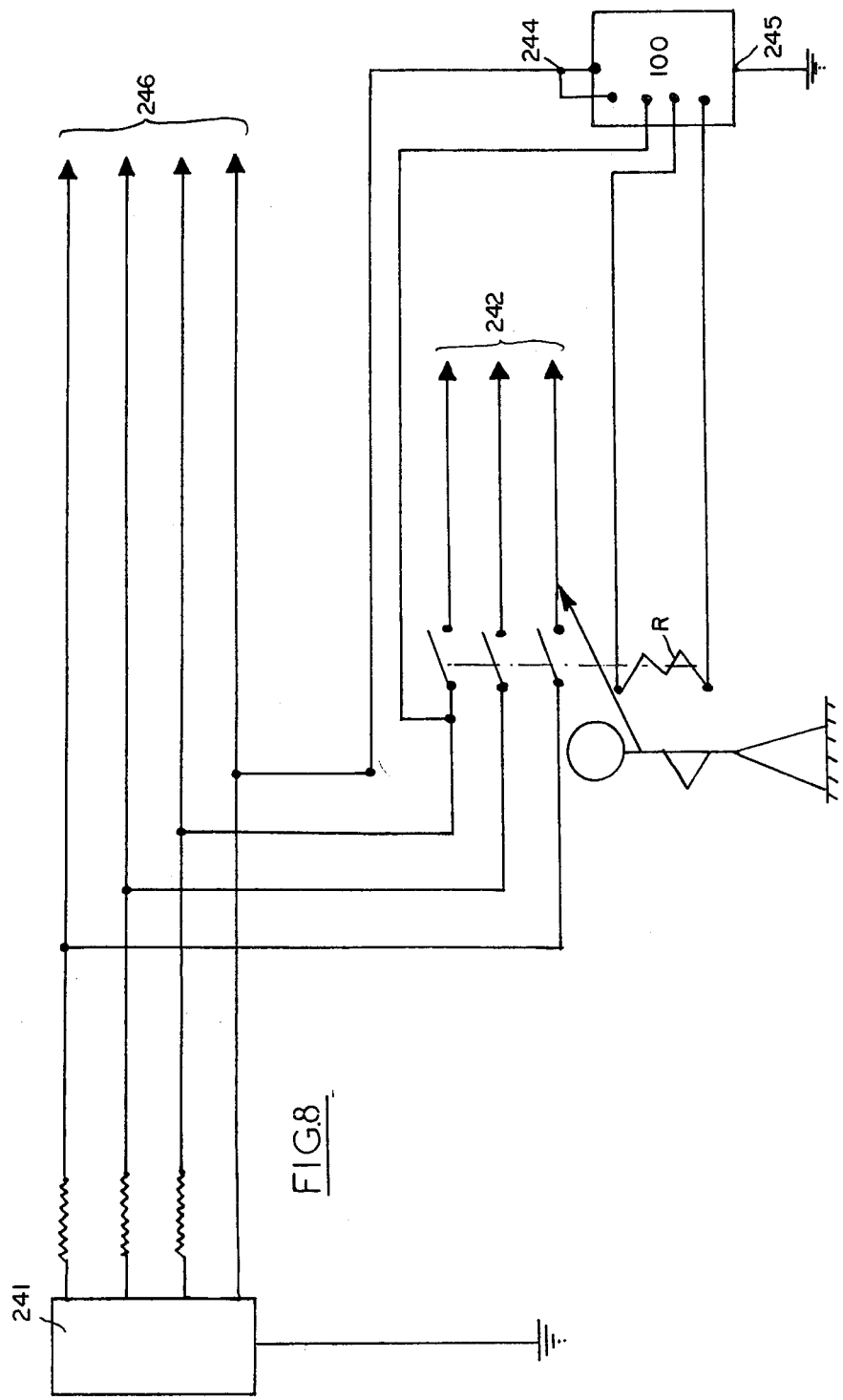
FIG. 8 shows the operation of the circuit of FIG. 7.

In the arrangement illustrated in FIG. 7, the neutral is connected directly to earth in the region of the transformer 241, whereas in the utilisation circuit 242 of the machine, it is interconnected to earth. The special transformer 243, comprising a winding of large wire for connecting the neutral and earth and another winding of fine wire having a large number of turns transforms the fault current on the neutral wire into a voltage V producing a signal which is sent to the amplifier of the detection system. The wiring of the detector 100 is illustrated in FIG. 8. No impedance appears between the neutral terminal 244 and the terminal 245 for connection to earth. The high sensitivity of the system 100 makes it possible to protect the operator against an insulation fault on any one of the phase leads or on the neutral of the utilisation circuit 242. In this circuit, as illustrated in FIG. 7, the neutral is interconnected to earth at various points such as 250, 250a . . . (FIG. 8 illustrates an alternative single phase supply of the detection circuit 100, taken from the three-phase supply circuit 246). The cut-off relay R opens when a fault voltage corresponding to a current greater than approximately 2 mA appears in the detection circuit 100.

Figure 9:
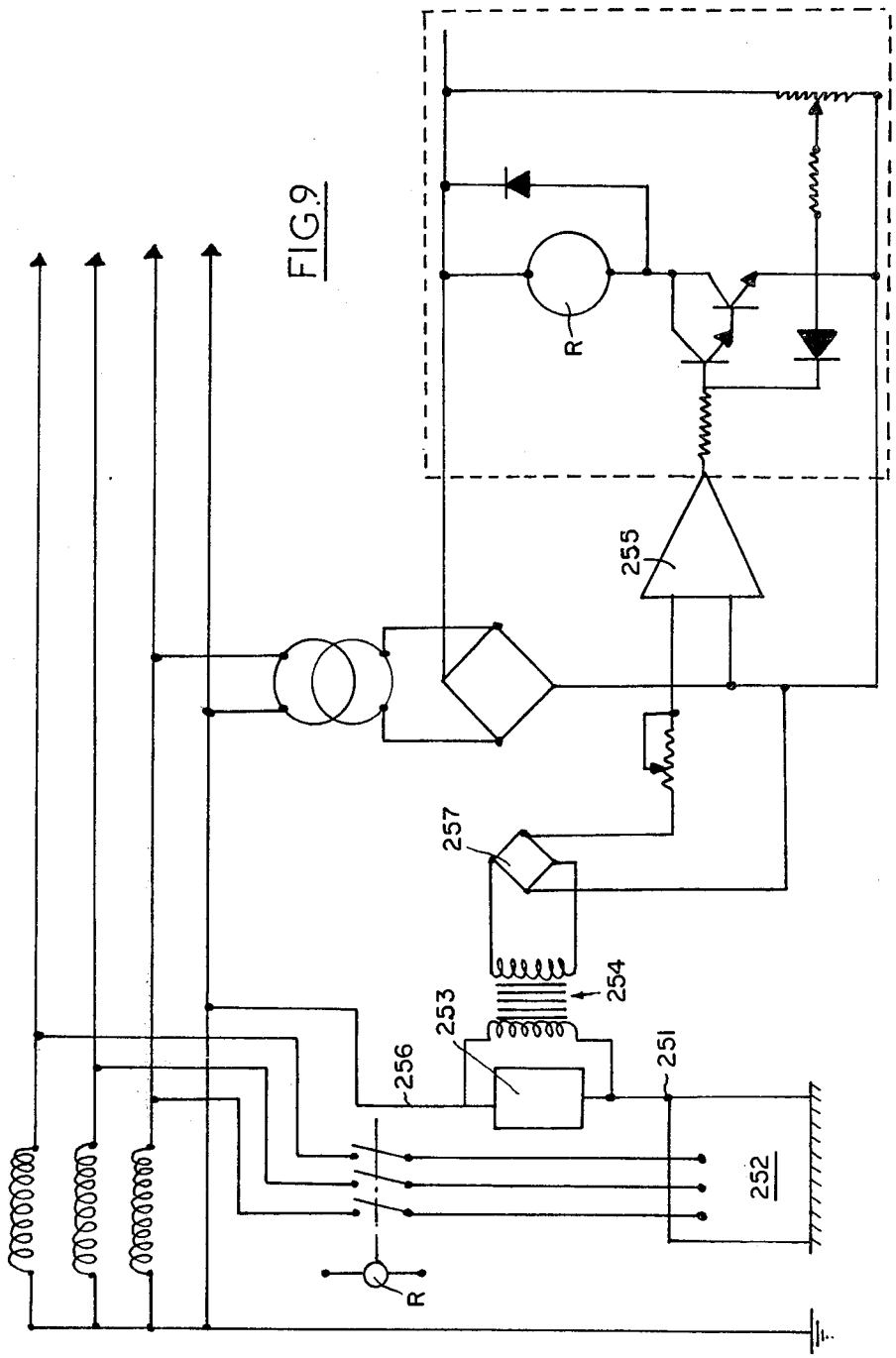
FIG. 9 is a variation of FIG. 7.

In the variation of FIG. 9, the neutral and the earth of the electrical circuit are interconnected and connected to the frame 251 of the machine 252 by means of a carbon block 253 which represents a very low resistance, for example of several milliohms. The extreme sensitivity of the detector makes it possible to detect the low impedence represented by this carbon block in order to ensure tripping of the safety device (opening of the relay R). To this end, the carbon block is connected in parallel with the primary winding of a two volt/thousand volt transformer. The secondary winding is connected to the amplifier 255 of the detector, through a rectifier 257.

The passage of a fault current on the neutral-frame wire 256 is transformed as regards voltage by the transformer 254 of the Ferrite type, owing to the resistance due to the carbon block 253 which creates a field of electrons. As seen previously, the monitoring voltage is direct and supplied by the supply circuit 246.

Figure 10:
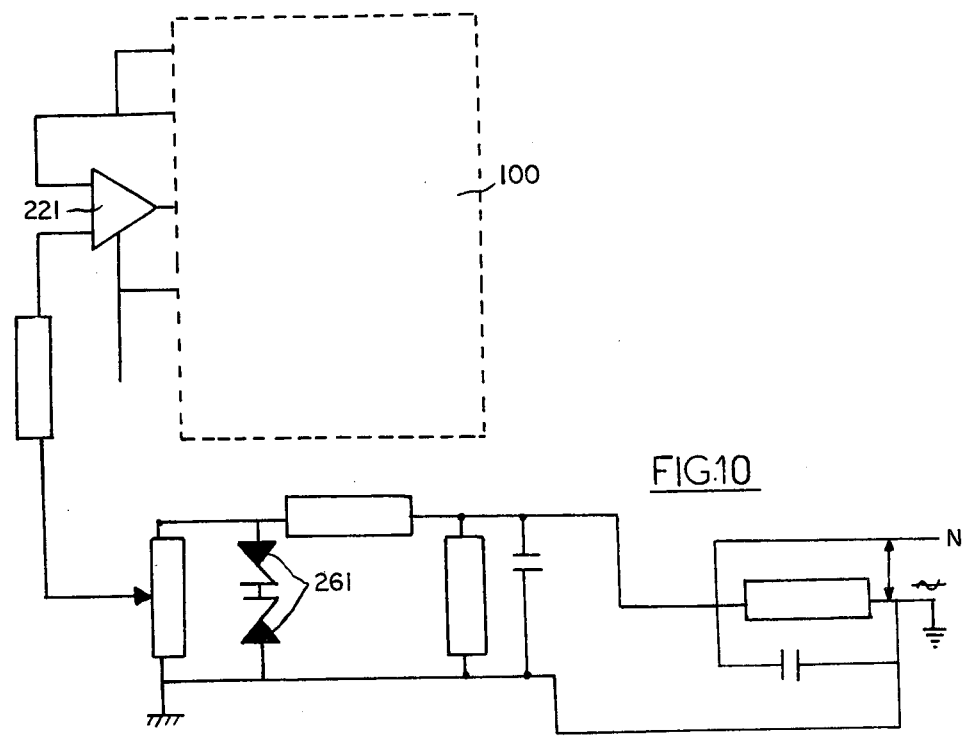
FIGS. 10 and 11 show circuits with the neutral connected directly to the earth on the transformer and independent earth on the machine circuit.
Figure 11:
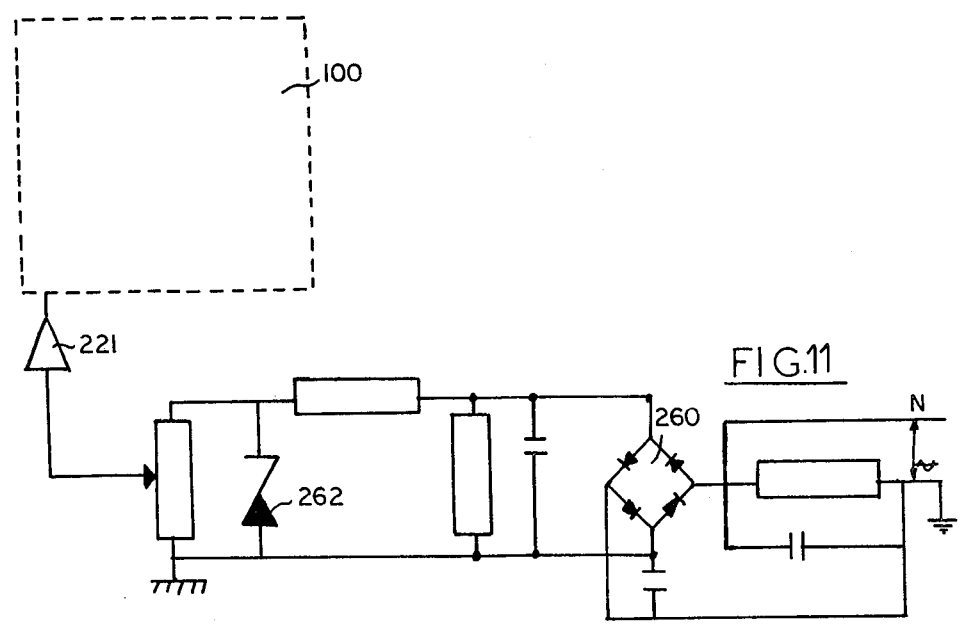

In the arrangement illustrated in FIGS. 10 and 11, the neutral is connected to earth directly in the region of the transformer connected to the mains. In the utilisation circuit of the machine, the earth is independent (there is no other connection between the neutral and earth). In FIG. 10, the input of the amplifier 221 is supplied directly with direct current. The arrangement of FIG. 11 is similar to the former, but the detector is supplied with an initially alternating current. A rectifying bridge 260 is thus provided upstream of the amplifier 221. Finally, the parasitic currents are filtered by means of a pair of Zener diodes 261 (in the case of direct current) and a single Zener diode 262 (in the case of direct current).

Figure 12:
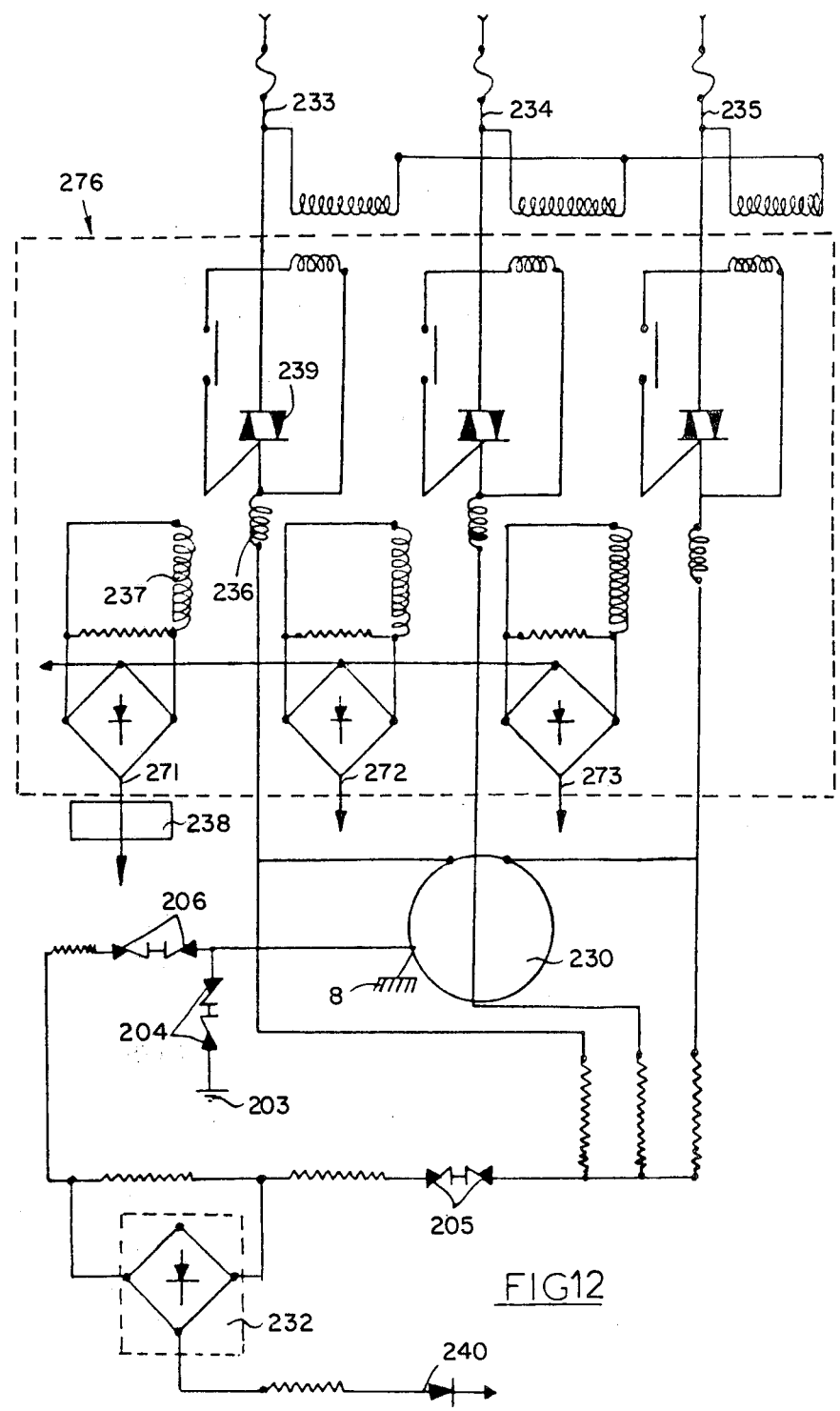
FIG. 12 is a diagram of a detector operating as a static switch and constituting the circuit for each wire of the circuit of a motor operating at its nominal torque (FIG. 13).

FIG. 12 shows a variation of the arrangement for the purpose of using the detection device (or devices) on the utilisation circuit of a motor operating at its nominal torque. This motor 230 is supplied for example with three-phase alternating current of 380 Volts. The frame 8 is connected to the earth 203 through the Zener diodes 204 and to the supply circuit 231 through the Zener diodes 205 and 206. The supply circuit is provided with a safety detection device shown diagrammatically at 232.

When the motor operates at its nominal torque, a nominal intensity passes through each of the phases 233, 234 and 235. Under these conditions, if one of the phases is earthed (even partially, under the effect of a leakage current due to an insulation fault), an increase in intensity occurs on the two other phases, this surge being able to damage the motor.

In order to eliminate this danger, each phase lead is equipped in the following manner:

the lead forms a winding of large turns (such as 236) which co-operates with a winding 237 made from a large number of fine turns, such that a transformer is thus produced whose fine secondary winding "reads"

all the variations of intensity in the primary winding. These variations and in particular the surges are transmitted to a tripping detection device 238. The device 238 is constructed for example in a manner similar to that shown in FIG. 3;

a static switch is provided, constituted by a triac 239 which cuts the supply to the power circuit when a fault (surge) is detected and has caused the opening of the contact-maker C).

Figure 13:
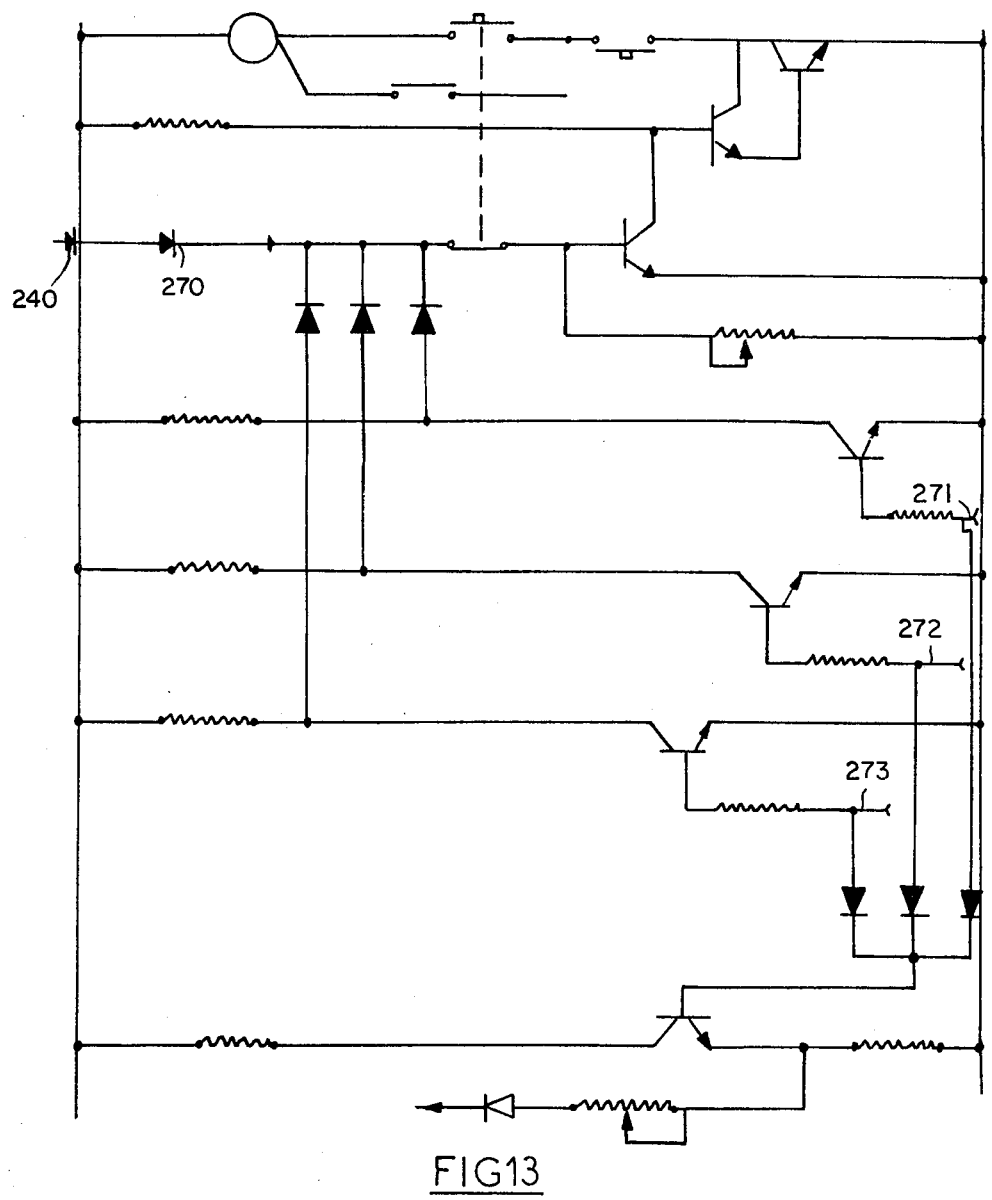

FIG. 13 shows the electrical circuit diagram of a detection device adapted to the static switch illustrated in FIG. 12. The input of the detector is at 270, which represents a diode connected to the output of the diode 240 of the switch of FIG. 12. Furthermore, the detection circuit comprises three similar circuits, each of the latter being connected to the output of a fine winding 237 of one phase of the supply of the motor 230. The leads bear the reference numerals 271, 272 and 273 respectively.

The apparatus illustrated in FIGS. 12 and 13 is particularly advantageous in the case of an arrangement where the neutral is connected directly to earth, such as the arrangements illustrated in FIG. 9, 10 or 11. In fact, it makes it possible to ensure safety, in the case of a supply of single phase or three phase current, when the machine operates at nominal torque. When a surge, created by a clear short circuit between two leads (between two phases or between one phase and the neutral), appears, tripping occurs.

For this, it is possible to incorporate in the arrangements of FIG. 7, 9, 10 or 11, the device 276 comprising the members described previously with reference to FIG. 12, this device being represented by the box drawn in broken lines. It makes it possible to detect each phase of excess voltage (direct short circuit between two phases).

This arrangement is the one which will be chosen for safety devices placed at the head of the general electrical supply lead to a workshop. It makes it possible to cut the power either at the time of a fault current or at the time of a direct short circuit, (i.e. a current of high intensity), whilst protecting the user or users of machines in the workshop.

Several typical and particularly remarkable examples of practical applications will be given.

The device of the invention makes it possible to provide complete safety for persons working in a humid atmosphere and required to use electrical devices. This is the case for example when one wishes to lower a cable carrying 380 Volts for supplying a ventilation unit placed in a drain. The transistors are replaced by thyristors which are re-set either manually, or automatically. Owing to their characteristic curve, these apparatus maintain a virtually constant tripping threshold, whatever the length of the cable.

Figure 14:
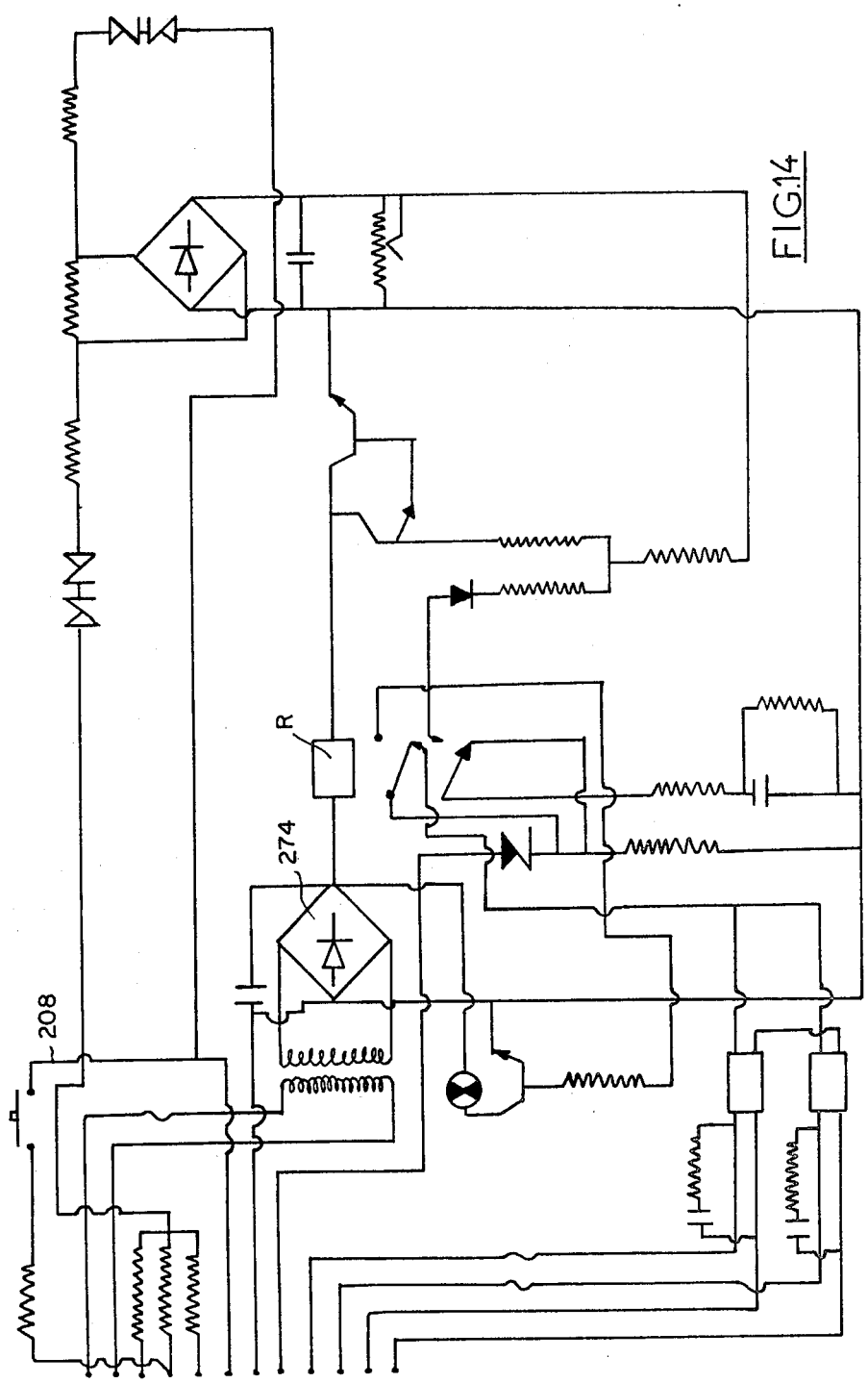
FIG. 14 is a detector of excess voltage which can be re-set automatically.

FIG. 14 illustrates a detector for faults and excess voltage particularly intended for protecting railway lines and installations, for example against flashes of lightning. These arrangements are always re-set automatically and have a positive safety device. Consequently, since the monitoring bridge 274 detects the fault permanently, the interruption of the relay R exists as long as the fault persists, whereas the positive safety device ensures the interruption if the detector is faulty.

The device checks the state of the circuit at regular intervals. As soon as the fault has disappeared, the relay R is automatically re-set and the electrical installation may operate normally: for example, a freezer interrupted momentarily subsequent to a storm will operate automatically as soon as the faults due to the storm have ceased.

Figure 15:
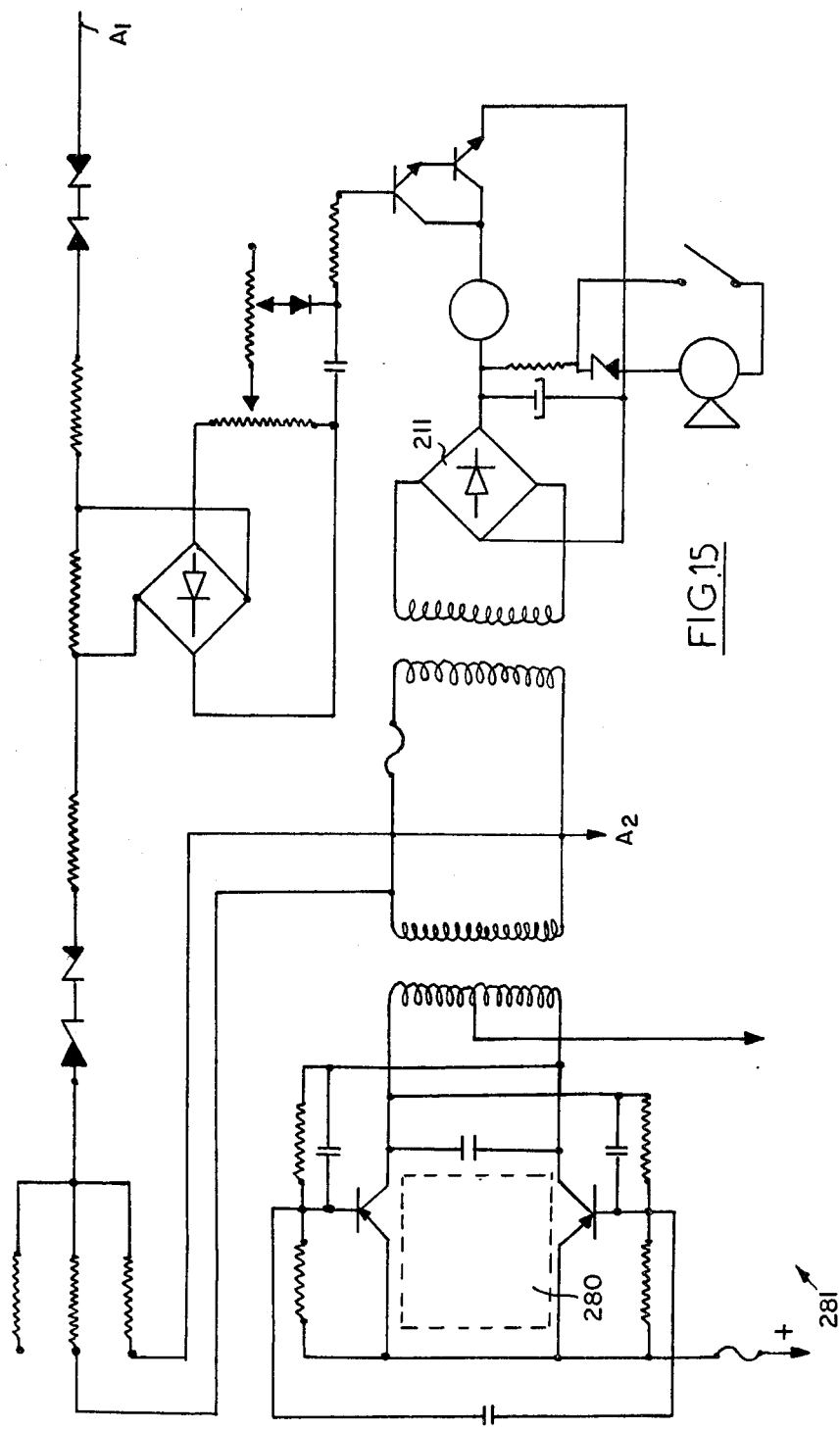
FIG. 15 shows a circuit provided for an alarm device.

Finally, the sensitivity of the detector makes it possible to use the latter as an alarm device (FIG. 15). Detection takes place on a single wire $A_1$ in the case of a floor which is earthed or on two wires $A_1$ and $A_2$ in the case of an insulated floor.

A converter 280 makes it possible to operate the circuit by means of a battery 281. The circuit may be connected to any alarm system (sound alarm, transmitter . . . ).

The diagrammatic views 16, 17 and 18 show various applications of the device as an alarm system.

Figure 16:
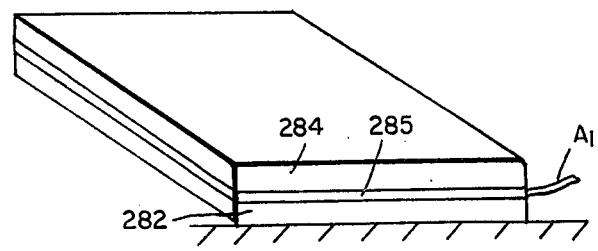
FIGS. 16 and 17 show an alarm by detection on one or two wires.
Figure 17:
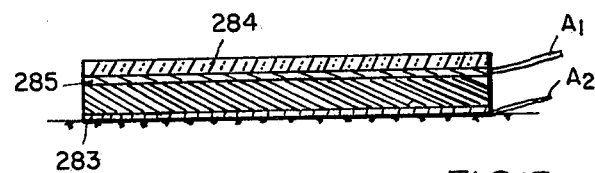

FIG. 16: the detecting wire $A_1$ is connected to a conducting sheet (aluminium) placed between an upper carpet and separated from an earthed floor by a rubber mat or the like 282. In FIG. 17, one uses a second sheet of aluminium 283 secured to the end of the wire $A_2$. When a person walks on the carpet 284, the sheet of aluminium 285 moves nearer either to the earth (FIG. 16) or to the sheet 283 (FIG. 17). In both cases a variation of the field is created, which is detected by the wire $A_1$, which causes tripping of the alarm (FIG. 15).

It has also been found that the system provides remote detection of a variation in an electrical field. For example, a signal Wire $A_1$ is connected in a loop and embedded in the mastic retaining the pane of glass in a window, exhibition window etc. The wire may also be incorporated in the material of the pane, glass, or surface to be protected.

It is possible to adjust the sensitivity of the device to obtain "remote" tripping at the time of an approach, therefore before the protected surface has been touched. The possibility of adjustment makes it possible to adapt the alarm detector to a large number of specific cases, requiring for example:

pressure on the pane; or breaking of the glass and insertion of the hand through the hole; or the approach of a minimum desired mass to cause tripping of the alarm.

Thus, the sensitivity of the apparatus may be adjusted in order that the detector is tripped for a mass of at least 10 kilos: a man sets off the alarm but the apparatus remains inert in the case of a small animal, for example a mouse.

Figure 18:
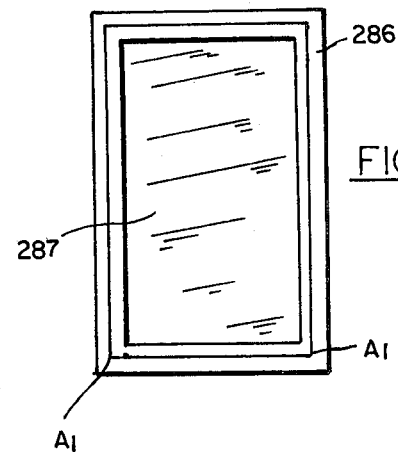
FIG. 18 shows another application of an alarm by detection of a variation of the field on a single wire of the device of FIG. 15.

Apart from the extreme slenderness of the apparatus used as an alarm, its advantage resides in the fact that tripping takes place on a single wire which anyone can embed or place at will in the product which holds the pane 287 on its frame 286 for example (FIG. 18) or in peripheral mouldings of furniture (filing cabinet, desk . . . ) to be protected.

Furthermore, it is possible to connect the detection apparatus as an anti-theft device for protecting one or more objects in front of which people walk. For example, in a museum, the wire may surround a table: the alarm will be tripped only if someone touches the table, ensuring virtually invisible effective protection. This particular application represents a considerable advantage with respect to radar devices which cannot be used during opening hours in museums.

These examples are in no way limiting. On the contrary, applications of the detection system of the invention are very numerous, sometimes surprising, owing to their simplicity and efficiency.

What we claim is:

1. A detection device for detecting insulation faults and error signal faults comprising:
   monitoring means for continuously applying an input voltage to at least two detection-and-safety circuits, said detection-and-safety circuits being connected in parallel and operable in electrical opposition, each of said detection-and-safety circuits including; detection means for receiving the output of said monitoring means,
   and safety means responsive to said detection means through bridge circuit means interposed between said detection means and said safety means, said safety means being electrically associated with ground and the frame of an electrical apparatus.

2. The detection device of claim 1 wherein said monitoring circuit includes a diode bridge, a potentiometer and a re-set means, said potentiometer and said re-set means being coupled to opposed junctions of said bridge so that said detection-and-safety circuits are independent of each other.

3. The detection device of claim 1 wherein said safety means includes at least two Zener diodes connected in opposition and having a predetermined minimum tripping voltage so that sperious signals do not actuate said safety means.

4. The detection device of claim 1 wherein said safety means includes at least two Zener diodes connected in opposition between said frame and said bridge circuit means, said Zener diodes having a first predetermined minimum tripping voltage so that sperious signals do not actuate said safety means.

5. The detection device of claim 4 further including at least two additional Zener diodes connected in opposition between ground and said frame, said additional Zener diodes having a second predetermined minimum tripping voltage different from said first predetermined tripping voltage.

6. The detection device of claim 1 wherein said electrical apparatus is coupled to said detection device and to ground through a transformer, said transformer having a primary and a secondary, said primary having a small number of large turns and said secondary having a large number of small turns.

7. The detection device of claim 3 further including a voltage storage means and a voltage responsive means connected in parallel.

8. The detection device of claim 1 wherein said electrical apparatus is coupled to said detection device and said frame through a carbon block.

9. The detection device of claim 7 wherein said voltage storage means is a capacitor and said voltage responsive means is a triac.

10. The detection device of claim 1 further including a reset device and a test circuit for checking the operation of said detection circuits.

* * * * *

UNITED STATES PATENT OFFICE
CERTIFICATE OF CORRECTION Page 1 of 2

Patent No. 4,206,490   Dated June 3, 1980

Inventor(s) Henri Parrier et al

It is certified that error appears in the above-identified patent and that said Letters Patent are hereby corrected as shown below:

Column 1, line 36 after the word "circuit" insert the word ----comprising----.

Column 2, line 13 delete the word "It" and insert ----If----.

Column 3, line 49 delete the title "Brief Description of the Drawings" and insert ----Description of the Preferred Embodiment----.

Column 4, line 66 delete the word "of", second occurrence and insert ----or----.

Column 6, line 43 delete the word "direct" and insert ----alternating----.

UNITED STATES PATENT OFFICE
CERTIFICATE OF CORRECTION

Patent No. 4,206,490    Dated June 3, 1980

Inventor(s) Henri Parrier et al

It is certified that error appears in the above-identified patent and that said Letters Patent are hereby corrected as shown below:

Column 3, line 66 delete the word "indentical" and insert ----identical----.

Column 5, line 39 delete the word "ralay" and insert ----relay----.

*Signed and Sealed this*

*Eleventh* Day of *November 1980*

[SEAL]

Attest:

SIDNEY A. DIAMOND

Attesting Officer    Commissioner of Patents and Trademarks